(12) United States Patent
Gulsun et al.

(10) Patent No.: US 7,860,290 B2
(45) Date of Patent: Dec. 28, 2010

(54) THREE-DIMENSIONAL (3D) MODELING OF CORONARY ARTERIES

(75) Inventors: Mehmet Akif Gulsun, Lawrenceville, NJ (US); Huseyin Tek, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 828 days.

(21) Appl. No.: 11/684,694

(22) Filed: Mar. 12, 2007

(65) Prior Publication Data

US 2007/0248250 A1 Oct. 25, 2007

Related U.S. Application Data

(60) Provisional application No. 60/794,294, filed on Apr. 21, 2006.

(51) Int. Cl.
*G06K 9/00* (2006.01)
(52) U.S. Cl. ...................................... 382/131
(58) Field of Classification Search ........................ None
See application file for complete search history.

(56) References Cited

U.S. PATENT DOCUMENTS

2003/0031351 A1* 2/2003 Yim ........................... 382/130
2008/0273777 A1* 11/2008 Luboz et al. ................ 382/130

FOREIGN PATENT DOCUMENTS

WO WO 03046835 A1 6/2003

OTHER PUBLICATIONS

Tek H., u. a.: "Multi-scale Vessel Boundary Detection". In: Computer Vision for Biomedical Image Application, CVBIA 2005, First International Workshop, Beijing, China, Oct. 21, 2005, Proceedings, S. 388 bis 398.
Tek H., u.a.: "Vessel Detection by Mean Shift Based Ray Propagation". In: IEEE Workshop on Mathematical Methods in Biomedical Image Analysis, MMBIA 2001, Dec. 9-10. 1001, S. 228 bis 235.

* cited by examiner

*Primary Examiner*—Charles Kim
(74) *Attorney, Agent, or Firm*—Donald B. Paschburg (57) ABSTRACT

A method for producing three-dimensional images of a blood vessel. A first set of seed points is placed along a first estimate of a centerline of the vessel. A cyclic graph is constructed around a first one of the seed points in a plane passing through the seed points. The graph comprises a plurality of nodes, with edges connecting the nodes. The nodes are disposed at equally spaced intervals about each one of a circumference of plurality of concentric circles centered at the seed point The method applies filtering such as multi-scale mean shift intensity detection orthogonal to the edges of the cyclic graph to thereby estimate a boundary of the vessel. A new center of the estimated boundary is determined to thereby generate a new seed point. The process is repeated using the new seed point to thereby generate a final boundary of the vessel in the plane.

9 Claims, 9 Drawing Sheets

THREE-DIMENSIONAL (3D) MODELING OF CORONARY ARTERIES

CROSS REFERENCE TO RELATED APPLICATION

This application claims priority from U.S. Provisional application Ser. No. 60/794,294 filed on Apr. 21, 2006 which is incorporated herein by reference.

TECHNICAL FIELD

This invention relates generally to Three-Dimensional (3D) modeling of coronary arteries.

BACKGROUND

As is known in the art, non-invasive diagnosis of coronary artery pathologies has become reality due to the technological advances in image acquisition devices such as the introduction of multi-detector CT. While these advances have definitely improved the image quality significantly, the diagnosis of such pathologies still requires advanced segmentation, quantification and visualization algorithms. Accurate segmentation of coronary arteries is a difficult problem. Specifically, the physical size of coronary arteries is quite small, i.e., their cross-sections often occupy few pixels. Thus, they are much more sensitive to noise and partial voluming effects than other blood vessels. Brightness of vessels decreases significantly along vessels, particularly, at the thinner branches. Presence of nearby bright structures introduces additional difficulties for the segmentation and visualization algorithms.

Numerous vessel segmentation algorithms have been proposed for the segmentation of blood vessels in CE-CTA/MRA, e.g. S. Aylward and E. B. E. Initialization, noise, singularities, and scale in height-ridge traversal for tubular object centerline extraction, IEEE Trans. on Medical Imaging, 21(2):61-75, 2002; K. Krissian, G. Malandain, N. Ayache, R. Vaillant, and Y. Trousset, Model based multiscale detection of 3d vessels, In IEEE Conf. CVPR, pages 722-727, 1998; K. Siddiqi and A. Vasilevskiy, 3d flux maximizing flows, In International Workshop on Energy Minimizing Methods In Computer Vision, 2001; D. Nain, A. Yezzi, and G. Turk, Vessel segmentation using a shape driven flow, In MICCAI, 2004; and O. Wink, W. J. Niessen, and M. A. Viergever, Multiscale vessel tracking, IEEE Trans. on Medical Imaging, 23(1):130-133, 2004. However, relatively fewer segmentation algorithms have specifically focused on coronary arteries (see C. Florin, R. Moreau-Gobard, and J. Williams. Automatic heart peripheral vessels segmentation based on a normal mip ray casting technique. In MICCAI, pages 483-490, 2004 and Y. Yang, A. Tannenbaum, and D. Giddens. Knowledge-based 3d segmentation and reconstruction of coronary arteries using CT images. In Int. Conf. of the IEEE EMBS, pages 1664-1666, 2004).

In general, most segmentation algorithms produce binary vessel map. Since coronaries are very small in size, quantification of pathologies from such maps is susceptible to the errors even in the case of accurate discrete segmentation results. Thus, additional sub-voxel surface modeling is required for accurate quantification. In general, the determination of such vessel models directly from original data is computationally challenging and robustness requires significant engineering efforts.

While accurate detection of coronary cross-sectional boundaries is crucial in stenosis quantification, such boundaries can be also used in constructing of 3D geometric model of coronary arteries. Recently, Tek et. al.(H. Tek, A. Ayvaci, and D. Comaniciu. Multi-scale vessel boundary detection. In Workshop of CVBIA, pages 388-398, 2005) presented a multi-scale model-based method for detecting vessel boundaries very accurately. (U.S. patent application Ser. No. 11/399,164, filed Apr. 6, 2006, entitled "Method and apparatus for detecting vessel boundaries", inventors Huseyin Tek, Alper Ayvaci and Dorin Comaniciu, published as U.S. Patent Publication 2006/262988 published Nov. 23, 2006, assigned to the same assignee as the present patent application, the subject matter thereof being incorporated herein by reference).

As is also known in the art, minimum mean cycle algorithms have been used for the vessel cross-sectional boundary detection. Recently, Jerymin and Isikawa (see I. Jermyn and H. Ishikawa, Globally optimal regions and boundaries as minimum ratio cycles, IEEE Trans. PAMI, 23(10): 1075-1088, 2001) used this approach on directed graphs for image segmentation. The main idea behind minimum mean cycle algorithm is to find a cycle (contour) in a graph such that its average cost is the minimum. Average cost of a cycle is simply the division of sum of all edge weights on the cycle by its length, the number of edges on the cycle. Mathematically, let $G=(V,E)$ be a graph with n vertices (V) and m weighted edges (E). A cycle, C on G is a path such that it consists of a subset of edges and its first node is the last. The total cost and length of a cycle is the sum of weights, $w(C)$ and sum of lengths, $|C|$ of edges on that cycle, respectively.

Minimum mean cycle algorithm minimizes division of total cost of the cycle by its length, $w(C)/|C|$. There are several algorithms for implementing the minimum mean cycle algorithm. One such algorithm is referred to as Howard's algorithm described in a paper by J. Cochet-Terrasson, G. Cohen, S. Gaubert, M. M. Gettrick, and J. P. Quadrat. Numerical computation of spectral elements in max-plus algebra. In Conf. on System Structure and Control, 1998) for computationally efficiency, i.e., $O(m)$, and accuracy.

SUMMARY

In accordance with the present invention, a method is provided for producing three-dimensional images of a blood vessel. The method includes placing a first set of seed points along a first estimate of a centerline of the vessel. A cyclic graph is constructed around a first one of the seed points, such graph being in a plane passing through such first one of the seed points and such plane being perpendicular to the first estimate of the centerline. The graph comprises a plurality of nodes and edges connecting the nodes. The method applies filtering orthogonal to the edges of the cyclic graph to thereby estimate image gradients in the plane perpendicular to the first estimate of the centerline. The vessel boundary is detected by using minimum mean cycle optimization algorithm operating on the cyclic graph where the weight (values) of edges of the graph is selected to be the inverse of image gradients obtained from the filtering. A new center of the estimated boundary is determined to thereby generate a new seed point. The process is repeated using the new seed point to thereby generate a final boundary of the vessel in the plane, such final boundary being established when newly generated seed points remain substantially fixed in position. The process is repeated for each one of the seed points in the first set of seed points. A surface of the vessel is produced from the final boundaries.

In one embodiment, the method applies multi-scale mean shift orthogonal to the edges of the cyclic graph to thereby estimate the image gradients in the plane perpendicular to the first estimate of the centerline.

In one embodiment, the graph comprises a plurality of nodes with edges connecting the nodes. The nodes are disposed at equally spaced intervals about each one of a circumference of plurality of concentric circles centered at the seed point.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
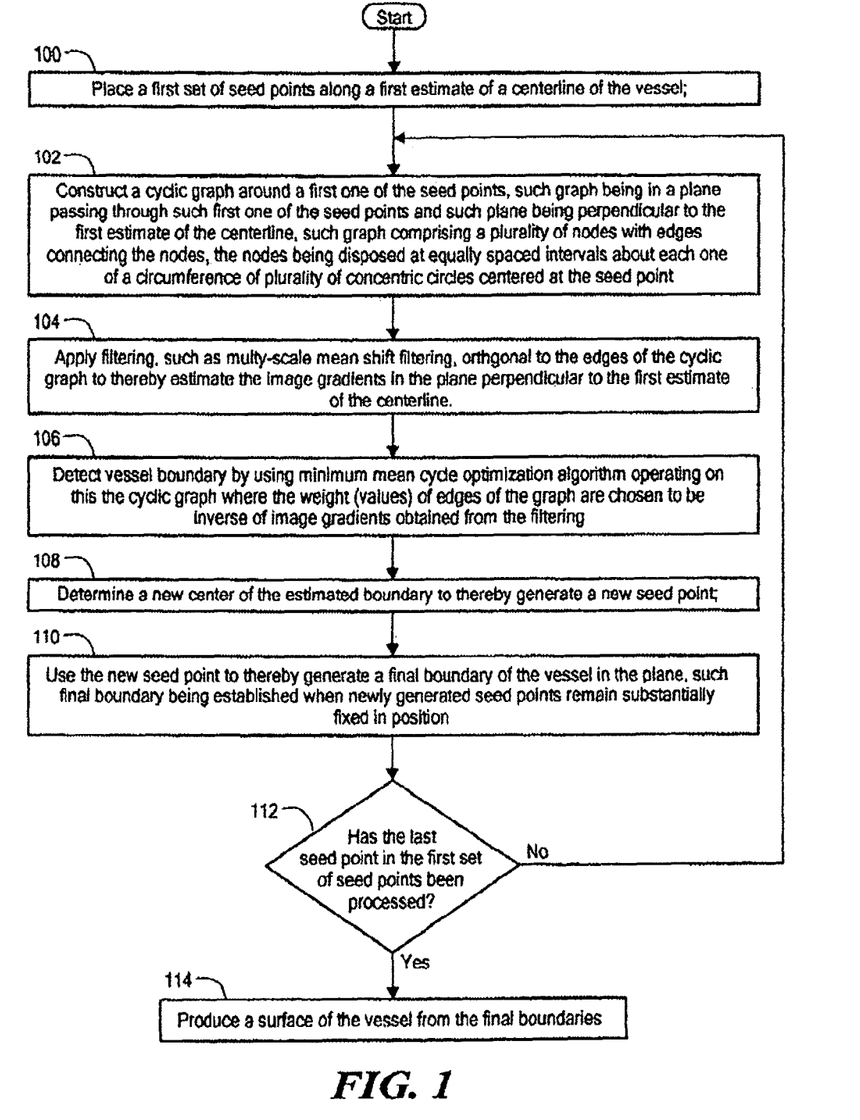
FIG. 1 is a flow chart of the process according to the invention.

Referring now to FIG. 1, a flow chart of the process is shown. Briefly, the process includes placing (either manually, or automatically using a computer algorithm) a first set of seed points along a first estimate of a centerline of the vessel, STEP 100. A cyclic graph is constructed around a first one of the seed points, such graph being in a plane passing through such first one of the seed points and such plane being perpendicular to the first estimate of the centerline. The graph comprises a plurality of nodes with edges connecting the nodes. The nodes are disposed at equally spaced intervals about each one of a circumference of plurality of concentric circles centered at the seed point, STEP 102. The method applies filtering such as, for example, multi-scale mean shift intensity detection, orthogonal to the edges of the cyclic graph to thereby estimate image gradients in the plane perpendicular to the first estimate of the centerline, STEP 104. Alternatively, image gradients can be computed by other techniques. Vessel boundary is detected by using minimum mean cycle optimization algorithm operating on the cyclic graph where the weight (values) of edges of the graph are chosen to be inverse of image gradients obtained from multi-scale mean shift filtering, STEP 108. Here, Howard's algorithm is used.

A new center of the estimated boundary is determined to thereby generate a new seed point, STEP 108. The process is repeated using the new seed point to thereby generate a final boundary of the vessel in the plane, such final boundary being established when newly generated seed points remain substantially fixed in position, STEP 110. The process is repeated for each one of the seed points in the first set of seed points. A surface of the vessel is produced from the final boundaries, STEP 112.

More particularly, the centerline may be obtained from a binary segmentation algorithm, e.g., T. Deschamps and L. Cohen, Fast extraction of minimal paths in 3d images and applications to virtual endoscopy, Medical Image Analysis, 5(4):281-299, 2001; and S. Olabarriaga, M. Breeuwer, and W. Niessen. Minimum cost path algorithm for coronary artery central axis tracking in CT images. In MICCAI, 2003, or can be created roughly by a user.

Figure 2A:
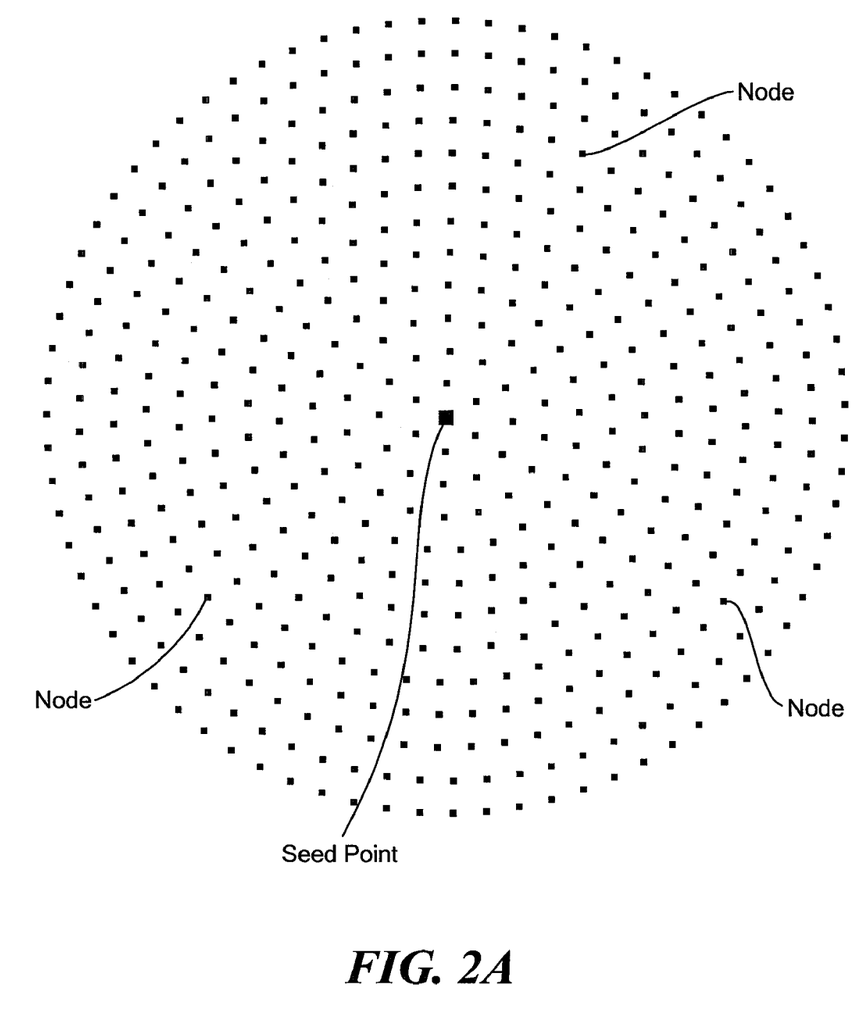
FIGS. 2A-2D illustrates a process for constructing a graph and applying such graph to a cross sectional image of a blood vessel and used to detect a boundary of the blood vessel in accordance with the invention.
Figure 2B:
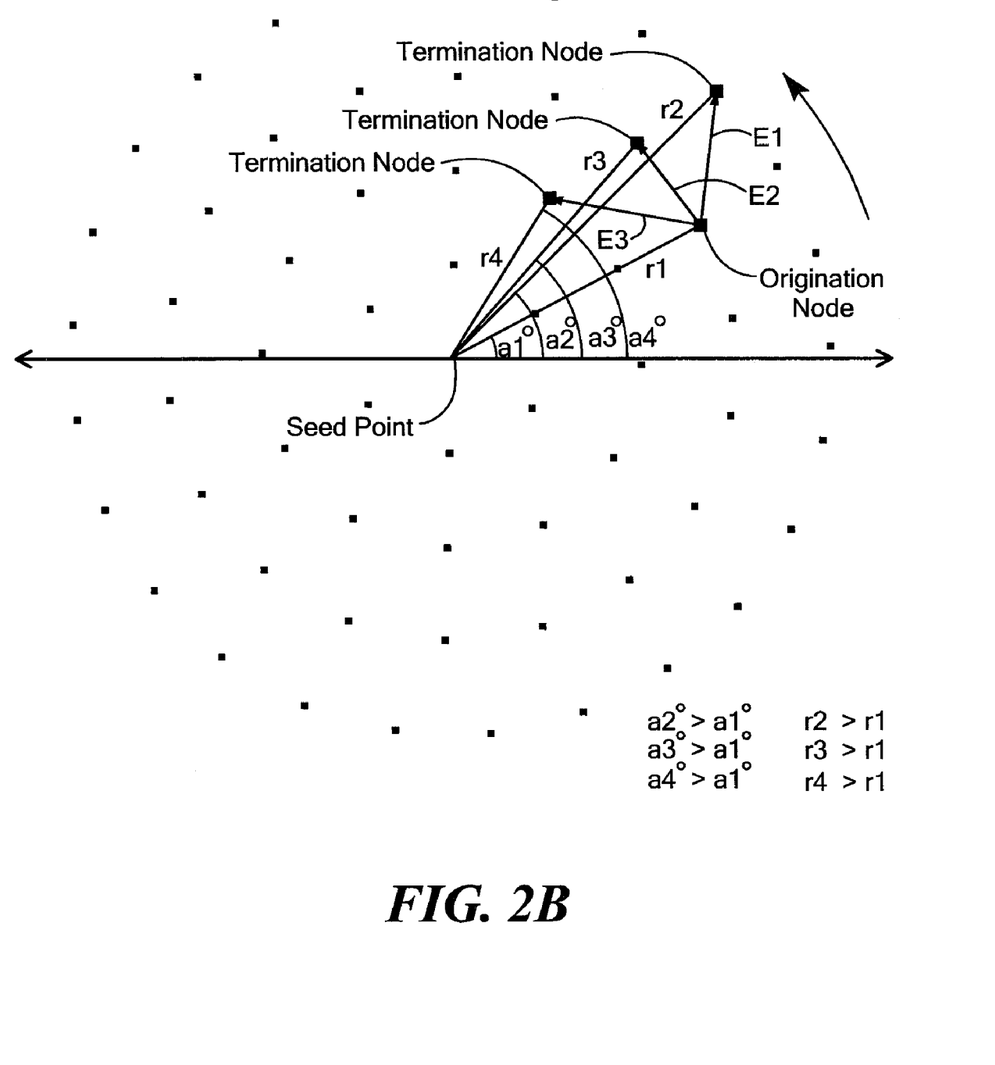
Figure 2C:
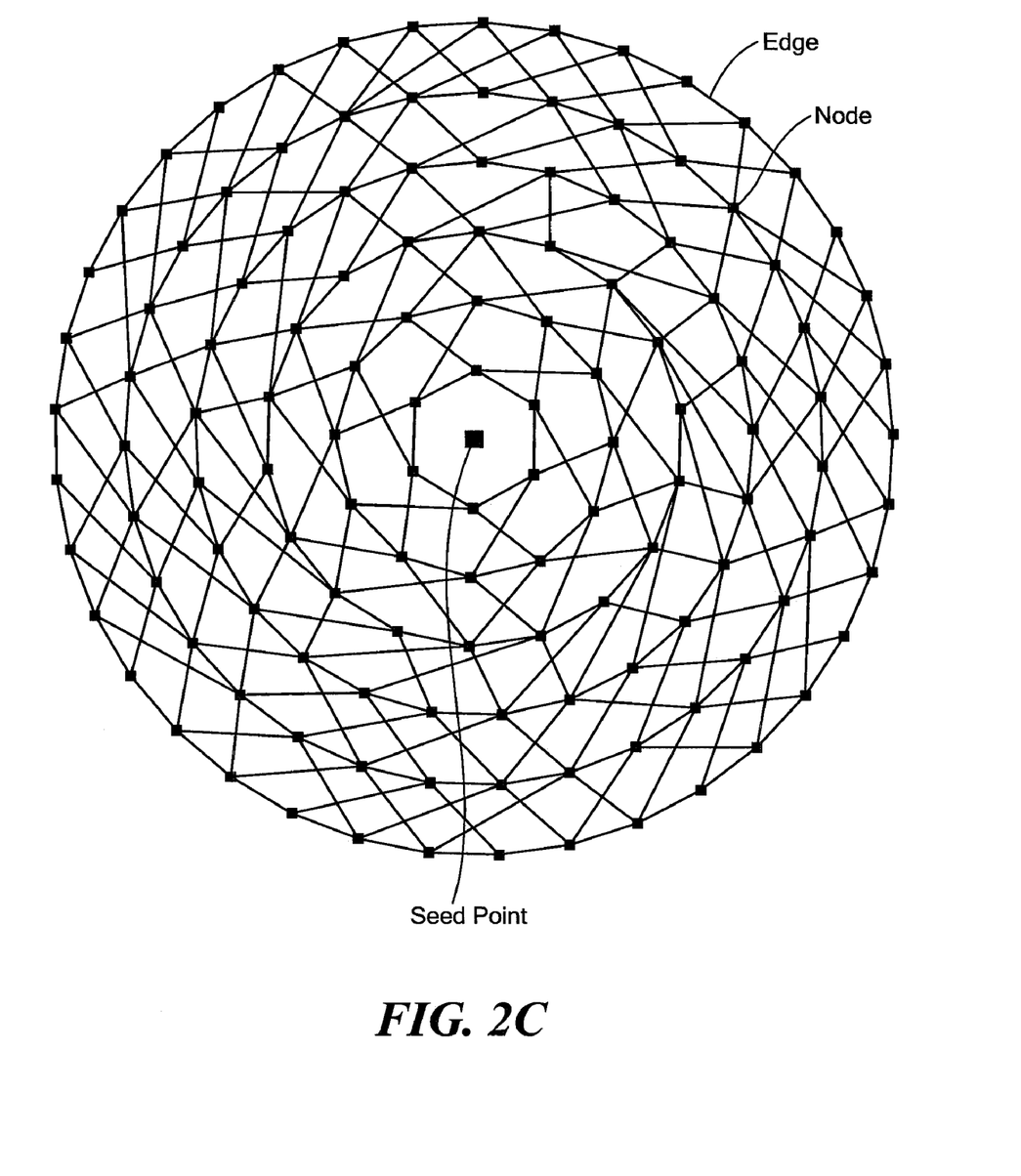

Next, a cyclic graph is constructed as follows: An array of nodes is established in the plane. More particularly, the nodes are arranged disposed at regular angles in concentric circles centered at the seed point estimated as described above. Thus, each node has a unique radius, r, and a unique angular deviation a from a reference axis (i.e., each node has a unique position that can be expressed in polar coordinates r, a, as shown for an exemplary mode highlighted in FIG. 2B having the polar coordinates r1, a1. Next, for each designated node, three edges, shown by the arrows in FIG. 2B, are constructed. More particularly, the edges being at an origination node and terminate at the three termination nodes closest to the designated origination node with the following additional condition: The termination nodes must be positioned at angles greater than the angle of the originating node, e.g. for the exemplary originating node at r1, a1, the termination nodes have angles a2, a3, and a4 where: a2 is greater than a1; a3 is greater than a1; and a4 is greater than a1. Thus, here the termination nodes have polar coordinates: r2, a2; r3, a3; and r4, a4. Next, lines, herein referred to as edges, are constructed from the origination node to each of the three termination nodes. Thus, referring to the example in FIG. 2B, three edges, E1, E2 and E3 are constructed. The complete graph is shown in FIG. 2C.

Figure 2D:
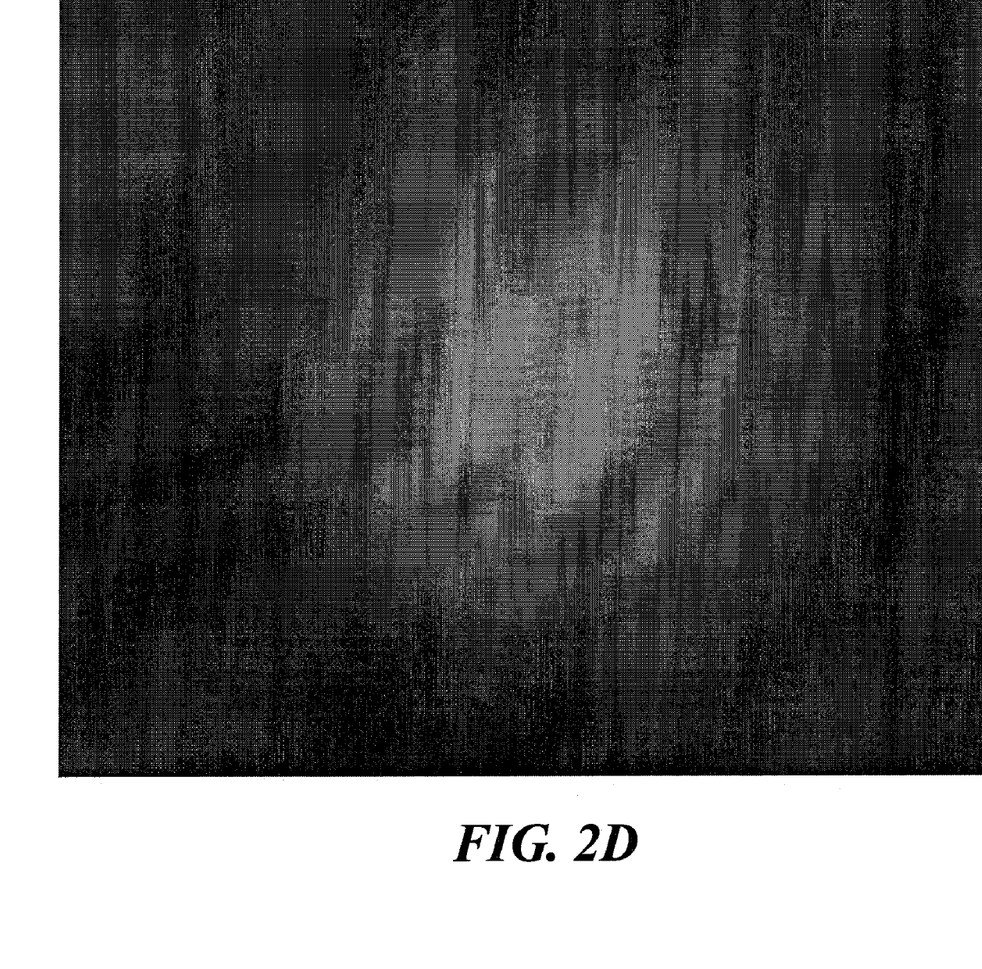
Figure 2E:
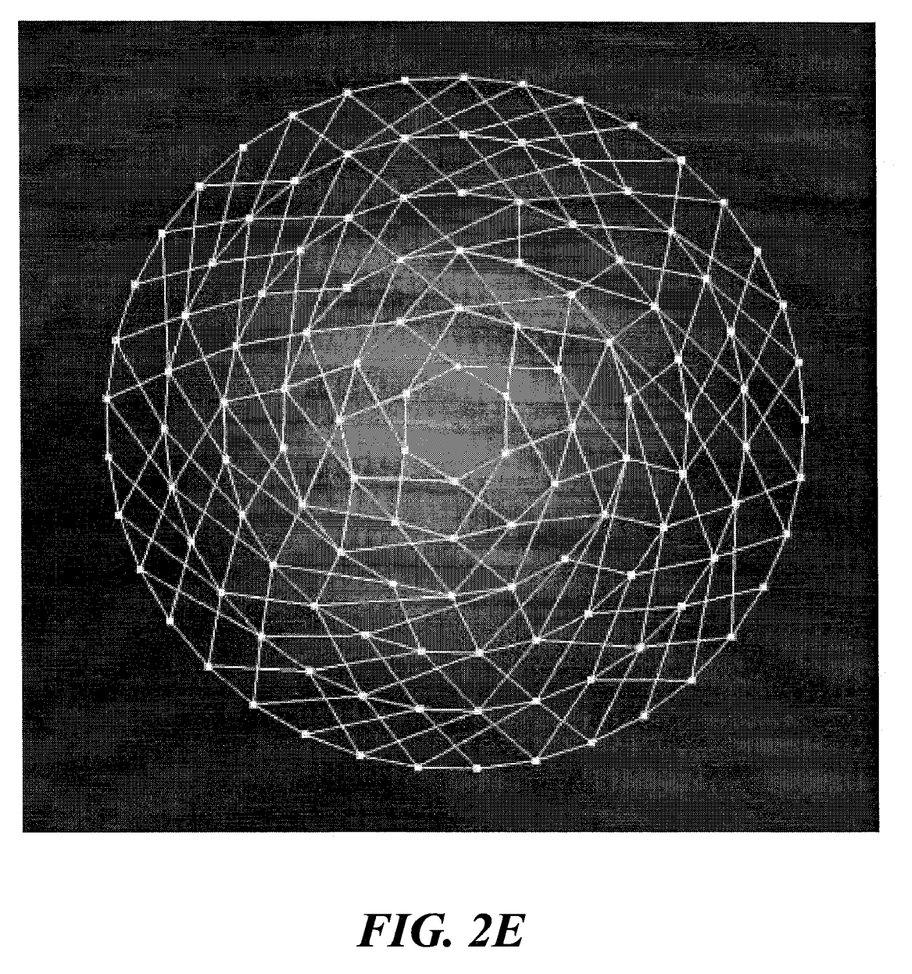
FIG. 2E depicts the graph superimposed on the image of the blood vessel shown in FIG. 2E, such boundary being determined in accordance with the invention.

Referring now to FIG. 2D, an image of a blood vessel is shown, such image being taken through a plane passing the centerline estimated as described above. It is noted that the blood vessel is lighter (i.e., has greater intensity in the central region with background i.e., neighboring tissue being shown in the darker, i.e., less intensity region). The boundary of the blood vessel is detected by observing changes in the intensity (i.e., the intensity gradient) as one progress outwardly from the seed point (i.e., the estimated center of the vessel). The graph of FIG. 2C is superimposed on the image as shown in FIG. 2E. Each one of the edges in the graph has associated with it a cost value. Here, in accordance with the invention, the gradient value (or cost) of an edge is computed from multi-scale shift filter applied orthogonally to the edge, as shown by the arrow in FIG. 2F. Multi-scale shift filtering is described in the above referenced, U.S. patent application Ser. No. 11/399,164, filed Apr. 6, 2006, entitled "Method and apparatus for detecting vessel boundaries", inventors Huseyin Tek, Alper Ayvaci and Dorin Comaniciu, published as U.S. Patent Publication 2006/262988 published Nov. 23, 2006, assigned to the same assignee as the present patent application, the subject matter thereof being incorporated herein by reference.

In traditional graph based representations, the cost of edges of graphs is assigned to be a function of the image gradients. Such image gradients are often computed by taking the intensity differences of pixels corresponding to two vertices of the edge. This would be fine if the structure boundaries are in the form of isolated step edges. However, in reality, diffuse edges, low contrast edges and gap edges occur frequently even in a single cross-sectional vessel boundary. The robust and accurate detection of edges from these intensity profiles requires edge detection in many scales. In this process the multi-scale mean-shift based edge detection first presented in H. Tek, A. Ayvaci, and D. Comaniciu, Multi-scale vessel boundary detection, In Workshop of CVBIA, pages 388-398, 2005 is adopted to the cyclic graph, referred to above, the subject matter thereof being incorporated herein by reference. Specifically, mean-shift analysis, see D. Comaniciu and P. Meer. Mean shift: A robust approach toward feature space analysis. IEEE Trans. PAMI, 24(5):603-619, 2002, have been used on detecting the edges of intensity data. However, the robustness and accuracy of results heavily depend on the selection of spatial and range scale parameters of mean-shift analysis because object boundary are often in many spatial and range scales. Tek et al. (H. Tek, A. Ayvaci, and D. Comaniciu. Multi-scale vessel boundary detection. In Workshop of CVBIA, pages 388-398, 2005) developed a geometry based algorithm, which applies spatial filter size operators along 1D-rays in many scales. The optimal range kernel size is directly from the intensity data contained under the spatial kernel. In this framework, edges obtained from multiple filters are combined by using the edge strength function and local mode of intensities (H. Tek, A. Ayvaci, and D. Comaniciu. Multi-scale vessel boundary detection. In Workshop of CVBIA, pages 388-398, 2005).

It is noted that, in traditional methods, cost of the edges cannot be computed orthogonal to the boundary of interest due to the lack of implicit object representation. However, here, the existence of the seed point implicitly defines the inner part of the structure, thus gradient computation is performed orthogonal to the edges. In other words, the process simply takes a sample from the ray orthogonal to the edge and performs multi-scale edge detection along this edge, which is illustrated in FIG. 2E. The process uses the inverse of multi-scale edge response for the weight of that edge, as described above in connection with FIG. 2F.

Figure 2F:
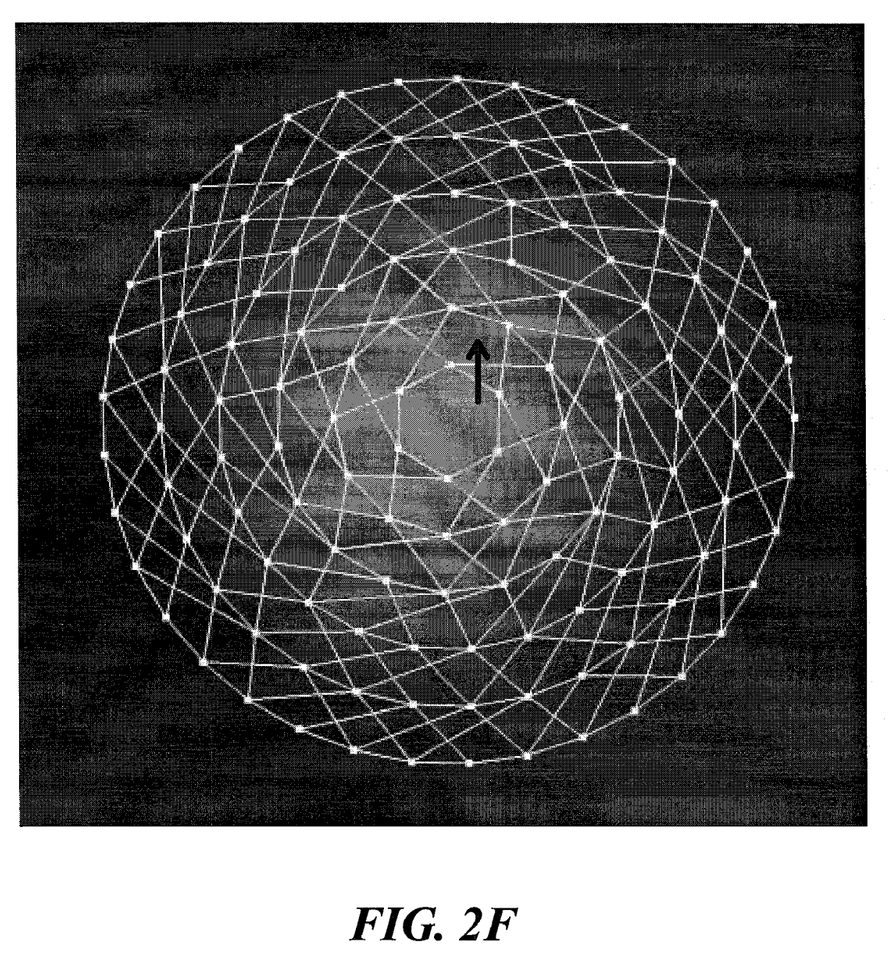
FIG. 2F illustrates an example of computing image gradients orthogonal to the edges of the graph.

A new center of the estimated boundary is determined to thereby generate a new seed point. The process is repeated using the new seed point to thereby generate a final boundary of the vessel in the plane, such final boundary being established when newly generated seed points remain substantially fixed in position. The final vessel boundary is shown in FIG. 2F superimposed on the original image of such vessel.

The process is repeated for each one of the seed points in the first set of seed points. A surface of the vessel is produced from the final boundaries.

Figure 3:
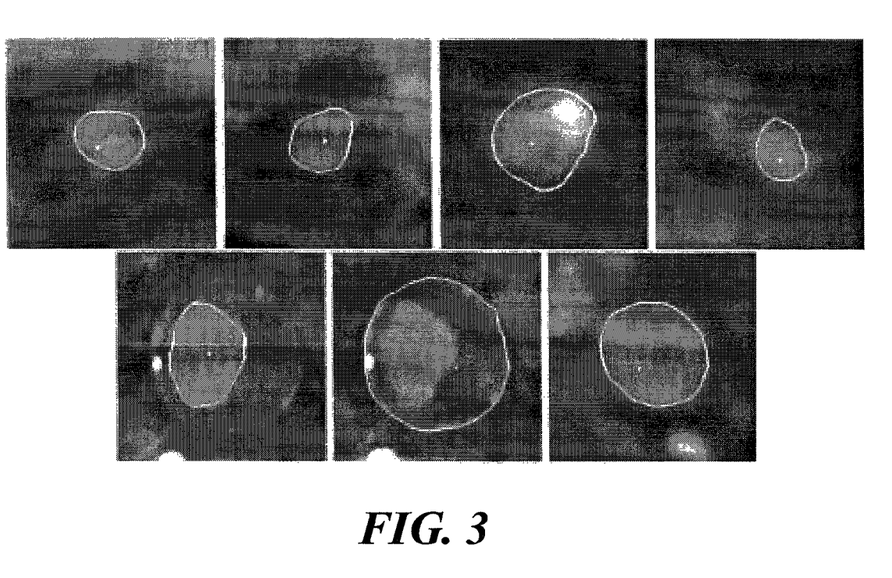
FIG. 3 illustrates the 2D Segmentation results on different vessels, the top row shows typical Coronaries (2), Calcification, Branch; the bottom row shows inner and outer boundaries of abdominal aortic aneurysm (AAA) and carotid arteries, observe that the seed point is also depicted.

FIG. 3 illustrates the cross-sectional boundary detection results from the method described above on coronary boundaries, carotid arteries and abdominal aortic aneurysm (AAA). In general, the detection of thrombus boundary in AAA's is quite difficult due to the low contrast between thromboses and its surroundings in CTA. Note that the method is able to obtain this boundary quite accurately.

Figure 4:
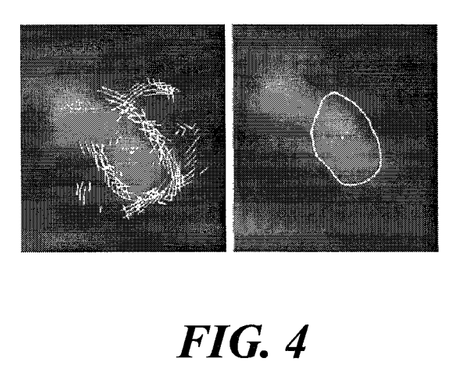
FIG. 4 illustrates that missing boundaries due to nearby structures are smoothly closed by the minimum mean cycle algorithm according to the invention with lines on the left image showing possible image edges.
Figure 5:
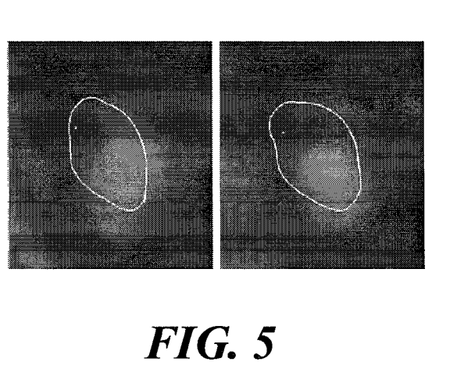
FIG. 5 illustrates that the method according to the invention is able to detect vessel boundaries even if the seed point is outside the vessel.

The method is suitable for computing vessel cross sectional boundaries for several reasons: Specifically, (i) it always returns a single closed and smooth contour, which is consistent with the typical vessel boundary. (ii) Missing edges on the vessel boundary, e.g. due to the nearby vessels, are naturally closed by smooth contour segments i.e., elliptical pieces, FIG. 4. (iii) There is no significant preference of contours based on their size since it computes the "mean" cost. Most graph cut based algorithms often prefers small contour segments over large ones, thus often resulting in significant errors. (iv) It is computationally efficient, i.e., it takes less than 0.5 second on Pentium IV 2.5 GHz PC. (v) The accuracy of the results is independent of the location of the seed point, FIG. 5.

Figure 6A:
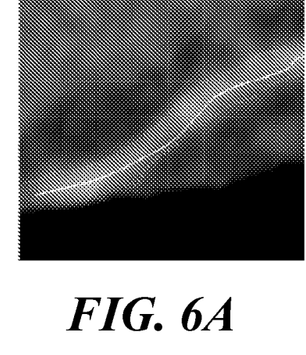
FIG. 6A depicts an initial centerline model and corresponding cross-sectional boundaries.
Figure 6B:
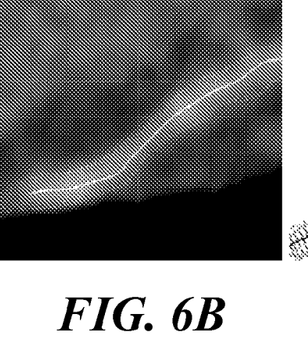
FIG. 6B depicts the corrected centerline model.
Figure 6C:
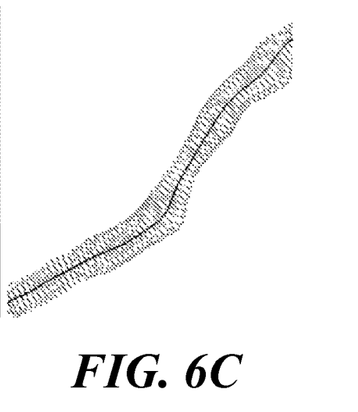
FIG. 6C shows a 3D visualization of the corrected path and boundaries.
Figure 7A:
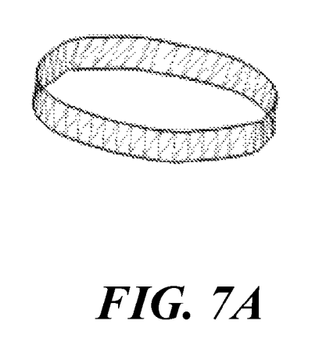
FIG. 7A shows the construction of 3D triangulated surface from two successive contours.
Figure 7B:
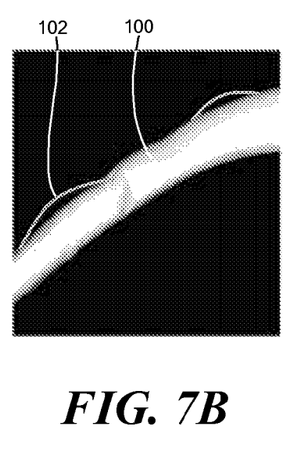
FIG. 7B illustrates that that correct modeling can be obtained even when the initial center axis curve goes outside vessel.
Figure 7C:
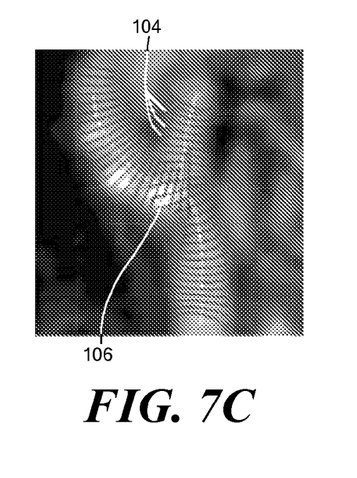
FIG. 7C shows the 2D contours at a junction, the 3D surface model being constructed from the union of these intersecting contours.
Figure 8:
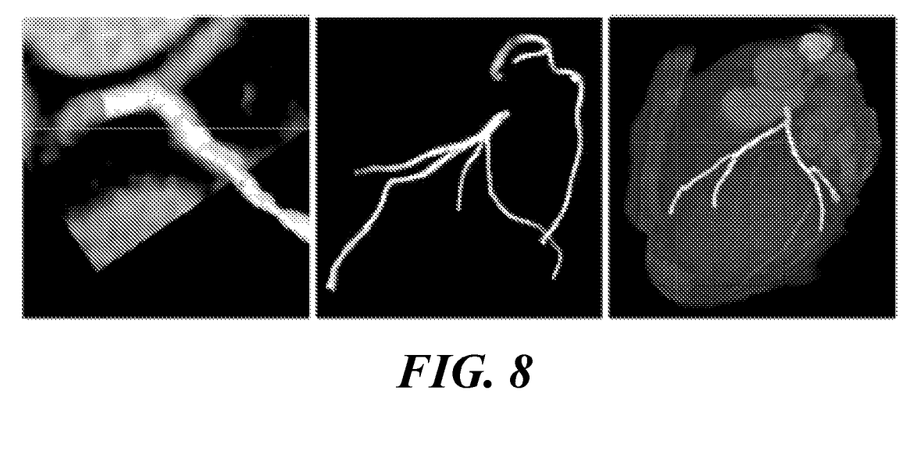
FIG. 8 illustrates the 3D construction of coronary arteries in CTA.

FIG. 6A illustrates an initial centerline model and the corresponding cross-sectional boundaries. The corrected centerline and cross-sectional boundaries by the algorithm is displayed in FIGS. 6B and 6C. It should be noted that this algorithm is robust to the errors in the initial path. Specifically, it is possible that centerline model 100 may partially travel outside the vessel, as in regions 102. In such cases, the seed point for the cross-sectional boundary falls outside the correct cross-sectional boundary. If the seed point is outside the vessel, the minimum mean cycle algorithm produces a 2D contour which includes the seed point and large portions of the vessel boundary, FIG. 5 and FIG. 7B. These results are not surprising since the algorithm implicitly closes missing parts of the boundary with smooth elliptical curve segments. Observe that the new centerline point detected from the center of this cross-sectional boundary falls inside the vessel. Thus, path points outside the vessels are pulled toward the real center of the vessel. Currently, each vessel branch is independently modeled by the method. It should be observed that the cross-sectional boundaries 104 of different branches intersect with each other at junctions 106, FIG. 7C. In such places, the union of the cross-sectional boundaries is used to construct 3D surface models. FIG. 8 illustrates the 3D coronary models obtained from the algorithm.

A number of embodiments of the invention have been described. Nevertheless, it will be understood that various modifications may be made without departing from the spirit and scope of the invention. Accordingly, other embodiments are within the scope of the following claims.

What is claimed is:

1. A method for producing three-dimensional images of a blood vessel, comprising:
    (a) placing a first set of seed points along a first estimate of a centerline of the vessel;
    (b) constructing a cyclic graph around a first one of the seed points, such graph being in a plane passing through such first one of the seed points and such plane being perpendicular to the first estimate of the centerline, such graph comprising a plurality of edges;
    (c) applying filtering orthogonal to the edges of the cyclic graph to thereby estimate image gradients in the plane perpendicular to the first estimate of the centerline;
    (d) detecting vessel boundary by using minimum mean cycle optimization algorithm operating on the cyclic graph where the weight (values) of edges of the graph are chosen to be inverse of image gradients obtained from the filtering;
    (e) determining a new center of the estimated boundary to thereby generate a new seed point;
    (f) repeating (b)-(e) using the new seed point to thereby generate a final boundary of the vessel in the plane, such final boundary being established when newly generated seed points remain substantially fixed in position (g) repeated (b)-(f) for each one of the seed points in the first set of seed points; and (h) producing a surface of the vessel from the final boundaries.

2. The method recited in claim 1 wherein the filtering comprises multi-scale mean shift intensity filtering.

3. The method recited in claim 1 wherein the graph comprises a plurality of nodes with the edges connecting the nodes, such nodes being disposed at equally spaced intervals about each one of a circumference of plurality of concentric circles centered at the seed point.

4. The method recited in claim 3 wherein the graph comprises a plurality of nodes with the edges connecting the nodes, such nodes being disposed at equally spaced intervals about each one of a circumference of plurality of concentric circles centered at the seed point.

5. A method for producing three-dimensional images of a blood vessel, such method comprising:

(a) placing a first set of seed points along a first estimate of a centerline of the vessel;

(b) constructing a cyclic graph around a first one of the seed points, such graph being in a plane passing through such first one of the seed points and such plane being perpendicular to the first estimate of the centerline, such graph comprises a plurality of nodes and edges connecting the nodes'

(c) applying filtering orthogonal to the edges of the cyclic graph to thereby estimate image gradients in the plane perpendicular to the first estimate of the centerline;

(d) detecting vessel boundary using minimum mean cycle optimization algorithm operating on the cyclic graph where the weights of the edges of the graph are selected to be the inverse of image gradients obtained from the filtering; and (e) determining a new center of the estimated boundary to thereby generate a new seed point.

6. The method recited in claim 5 including repeated (b)-(e) using the new seed point to thereby generate a final boundary of the vessel in the plane, such final boundary being established when newly generated seed points remain substantially fixed in position.

7. The method recited in claim 6 including repeated such method for each one of the seed points in the first set of seed points.

8. The method recited in claim 7 including producing a surface of the vessel from the final boundaries.

9. The method recited in claim 5 wherein the filtering comprises multi-scale mean shift intensity filtering.

* * * * *